United States Patent
Jaaskelainen et al.

(10) Patent No.: US 9,651,435 B2
(45) Date of Patent: May 16, 2017

(54) DISTRIBUTED STRAIN AND TEMPERATURE SENSING SYSTEM

(71) Applicant: HALLIBURTON ENERGY SERVICES, INC., Houston, TX (US)

(72) Inventors: Mikko Jaaskelainen, Katy, TX (US); Ian B. Mitchell, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 524 days.

(21) Appl. No.: 13/847,204

(22) Filed: Mar. 19, 2013

(65) Prior Publication Data

US 2014/0285793 A1    Sep. 25, 2014

(51) Int. Cl.
| | | |
|---|---|---|
| *G02B 6/00* | (2006.01) | |
| *G01L 1/24* | (2006.01) | |
| *G01V 8/16* | (2006.01) | |
| *G01K 11/32* | (2006.01) | |
| *E21B 47/00* | (2012.01) | |
| *G01H 9/00* | (2006.01) | |

(52) U.S. Cl.
CPC .............. *G01L 1/242* (2013.01); *E21B 47/00* (2013.01); *G01H 9/004* (2013.01); *G01K 11/32* (2013.01); *G01V 8/16* (2013.01); *G01K 2011/322* (2013.01); *G01V 2210/1429* (2013.01)

(58) Field of Classification Search
None
See application file for complete search history.

(56) References Cited

U.S. PATENT DOCUMENTS

| | | |
|---|---|---|
| 5,191,206 A | 3/1993 | Boiarski et al. |
| 6,995,899 B2 | 2/2006 | Aronstam |
| 7,583,371 B2 | 9/2009 | MacDougall |
| 7,599,047 B2 | 10/2009 | Zou et al. |
| 8,274,400 B2 | 9/2012 | Wilson et al. |
| 8,365,431 B1 | 2/2013 | Parish |
| 2004/0190588 A1 | 9/2004 | MacDougall |
| 2005/0094129 A1 | 5/2005 | MacDougall |
| 2008/0063337 A1 | 3/2008 | MacDougall et al. |
| 2008/0084914 A1 | 4/2008 | Yamamoto |

(Continued)

FOREIGN PATENT DOCUMENTS

| | | | |
|---|---|---|---|
| EP | 2883023 A1 | 6/2015 | |
| GB | WO2011/010110 A2 * | 7/2009 | ............ G01D 5/353 |
| WO | 2014025614 A1 | 2/2014 | |

OTHER PUBLICATIONS

International Search Report with Written Opinion issued Jun. 3, 2014 for PCT Patent Application No. PCT/US2014/015484, 16 pages.

(Continued)

*Primary Examiner* — Chad Smith
(74) *Attorney, Agent, or Firm* — Chamberlain Hrdlicka

(57) ABSTRACT

A downhole optical sensing system can include an optical fiber positioned in the well, the optical fiber including multiple cores, and one of the cores having a Brillouin scattering coefficient which is different from another one of the cores. A method of sensing strain and temperature as distributed along an optical fiber can include measuring Brillouin scattering in a core of the optical fiber disposed in a well, and measuring Brillouin scattering in another core of the optical fiber disposed in the well, the optical fiber cores being exposed to a same strain and temperature distribution in the well.

21 Claims, 3 Drawing Sheets

(56) References Cited

U.S. PATENT DOCUMENTS

| | | | |
|---|---|---|---|
| 2011/0088462 A1 | 4/2011 | Samson et al. | |
| 2011/0090496 A1* | 4/2011 | Samson | E21B 47/065 356/301 |
| 2012/0127459 A1* | 5/2012 | Handerek | 356/73.1 |
| 2014/0042306 A1* | 2/2014 | Hoover | G01J 5/0821 250/227.14 |

OTHER PUBLICATIONS

Encyclopedia of Laser Physics and Technology; "Double-clad Fibers", article via http://www.rp-photonics.com/double_clad_fibers.html, dated Feb. 12, 2013, 4 pages.
Oz Optics; "Fiber Optic Distributed Brillouin Sensors", article DTS0115 via www.ozoptics.com, dated Sep. 22, 2006, 5 pages.
Thevenaz, Luc et al.; "Truly Distributed Strain and Temperature Sensing Using Embedded Optical Fibers", article via http://dewww.epfl.ch/met/metrology.html, received Feb. 11, 2013, 15 pages.
Smith, Jeff et al.; "Simultaneous Distributed Strain and Temperature Measurement", Applied Optics, vol. 38, No. 25, dated Sep. 1, 1999, 6 pages.
AFL; "DNS-4793 FiberRod—2.03mm Glass Matrix with VHS500 CSPFA fiber, 200C glass version", product specifications, received Feb. 11, 2013, 1 page.
Fibertronix; "Double Clad Optical Fiber", product specification, dated Feb. 3, 2010, 1 page.
Luna Innovations; "Fiber Optic Shape Sensing", technology snapshot, Feb. 24, 2012, 3 pages.
Laser Focus World; "Multicore Optical Fibers Could Be Next-Gen PON Solution", article via http://www.laserfocusworld.com/articles/2012/01/multicore-optical-fibers.html, dated Feb. 8, 2013, 2 pages.
A. Boh Ruffin; "Stimulated Brillouin Scattering: An Overview of Measurements, System Impairments, and Applications", NIST-SOFM 2004, dated 2004, 6 pages.
Luna Technologies; "Optical Backscatter Reflectometer", Model OBR 4600, LTOBR4600 article via www.lunatechnologies.com, dated Sep. 3, 2010, 4 pages.
Luna Innovations Incorporated; "Fiber Optic Shape Sensing", technology snapshot, dated Aug. 24, 2012, 4 pages.
Ezine Articles; "What are Optical Fiber Amplifiers and How Do They Work?", article via http://ezinearticles.com, dated Feb. 12, 2013, 2 pages.
P.C. Wait, et al.; "Landau Placzek Ratio Applied to Distributed Fibre Sensing", Optics Communications 122 article, pp. 141-146, dated Jan. 1, 1996, 6 pages.
Specification and Drawings for U.S. Appl. No. 13/847,165, filed Mar. 19, 2013, 27 pages.
Specification and Drawings for U.S. Appl. No. 13/847,183, filed Mar. 19, 2013, 24 pages.
"International Application Serial No. PCT/US2014/015484, International Preliminary Report on Patentability mailed Oct. 1, 2015", 13 pgs.
"Canadian Application Serial No. 2,894,563, Office Action mailed May 18, 2016", 4 pgs.
Extended European Search Report issued in corresponding application No. 14767564.9 dated Sep. 21, 2016, 10 pgs.

* cited by examiner

DISTRIBUTED STRAIN AND TEMPERATURE SENSING SYSTEM

BACKGROUND

This disclosure relates generally to equipment utilized and operations performed in conjunction with a subterranean well and, in an example described below, more particularly provides to the art a downhole distributed strain and temperature sensing system.

The application of this disclosure's principles to subterranean wells is beneficial, because it is useful to monitor dynamic wellbore conditions (e.g., pressure, temperature, strain, etc.) during various stages of well construction and operation. However, pressures and temperatures in a wellbore can exceed the capabilities of conventional piezoelectric and electronic pressure sensors. Optical fibers, on the other hand, have greater temperature capability, corrosion resistance and electromagnetic insensitivity as compared to conventional sensors.

Therefore, it will be appreciated that advancements are needed in the art of measuring downhole parameters with optical sensing systems.

DETAILED DESCRIPTION

Figure 1:
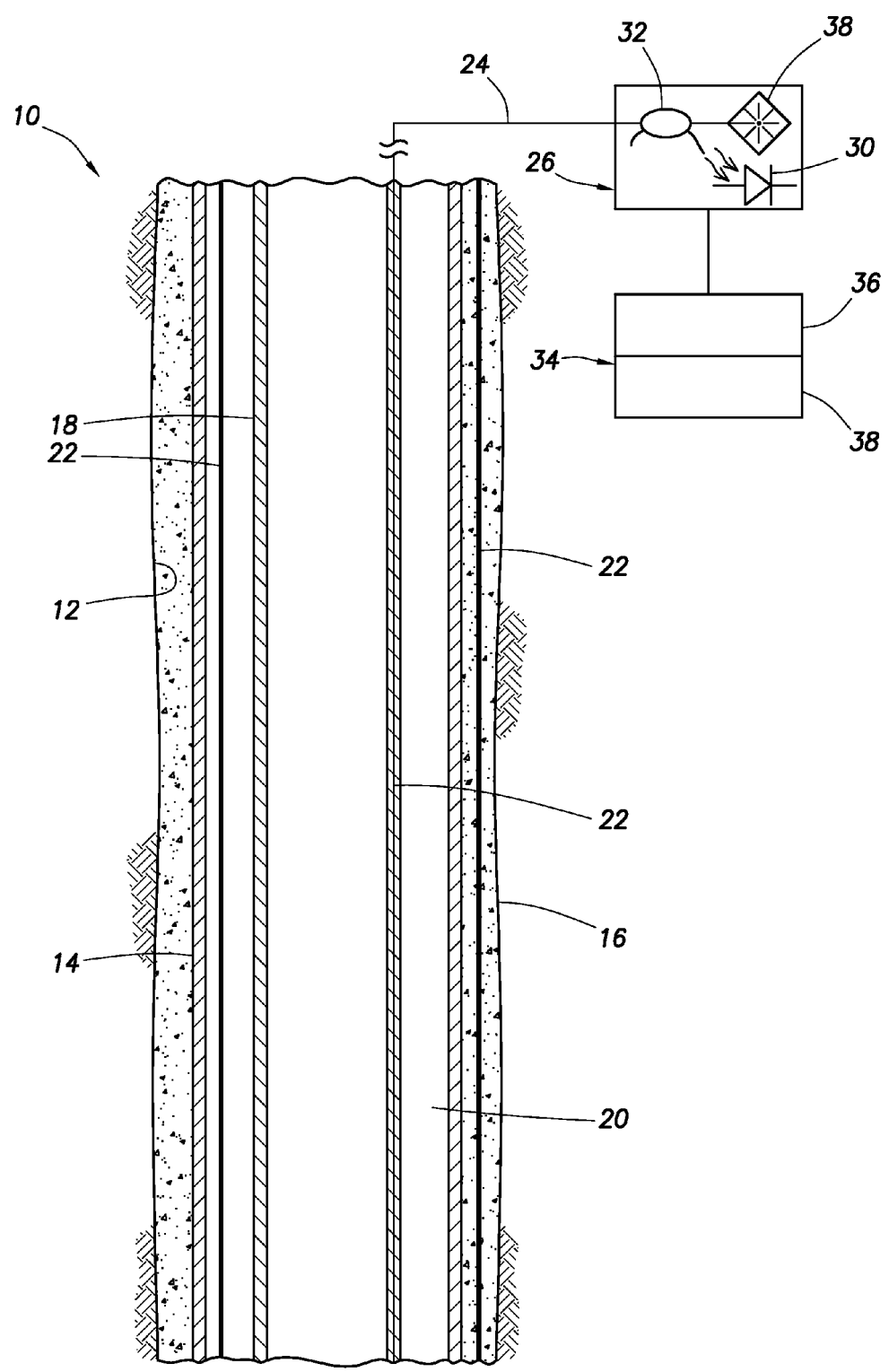
FIG. 1 is a representative partially cross-sectional view of a downhole sensing system and associated method which can embody principles of this disclosure.

Representatively illustrated in FIG. 1 is a downhole optical sensing system 10, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a wellbore 12 is lined with casing 14 and cement 16. A tubular string 18 (such as, a coiled tubing or production tubing string) is positioned in the casing 14.

The system 10 may be used while producing and/or injecting fluids in the well. Well parameters (such as pressure, temperature, resistivity, chemical composition, flow rate, etc.) along the wellbore 12 can vary for a variety of different reasons (e.g., a particular production or injection activity, different fluid densities, pressure signals transmitted via an interior of the tubular string 18 or an annulus 20 between the tubular string and the casing 14, etc.). Thus, it will be appreciated that the scope of this disclosure is not limited to any particular use for the well, to any particular reason for determining any particular well parameter, or to measurement of any well parameter in the well.

Optical cables 22 are depicted in FIG. 1 as extending longitudinally through the wellbore 12 via a wall of the tubular string 18, in the annulus 20 between the tubular string and the casing 14, and in the cement 16 external to the casing 14. These positions are merely shown as examples of optical cable positions, but any position may be used as appropriate for the circumstances (for example, attached to an exterior of the tubular string 18, etc.), extending helically or otherwise (e.g., back and forth across one or more well surfaces) relative to a wellbore or tubular string, etc.

The cables 22 may include any combination of lines (such as, optical, electrical and hydraulic lines), reinforcement, etc. The scope of this disclosure is not limited to use of any particular type of cable in a well.

An optical waveguide (such as, an optical fiber 24, optical ribbon, etc.) of each cable 22 is optically coupled to an optical interrogator 26. In this example, the interrogator 26 includes at least a light source 28 (such as, a tunable laser), an optical detector 30 (such as, a photodiode, photo-detector or optical transducer), and an optical coupler 32 for launching light into the fiber 24 from the source 28 and directing returned light to the detector 30. However, the scope of this disclosure is not limited to use of any particular type of optical interrogator including any particular combination of optical components.

A control system 34, including at least a controller 36 and a computing device 38 may be used to control operation of the interrogator 26. The computing device 38 (such as, a computer including at least a processor and memory) may be used to determine when and how the interrogator 26 should be operated, and the controller 36 may be used to operate the interrogator as determined by the computing device. Measurements made by the optical detector 30 may be recorded in memory of the computing device 38.

Figure 2:
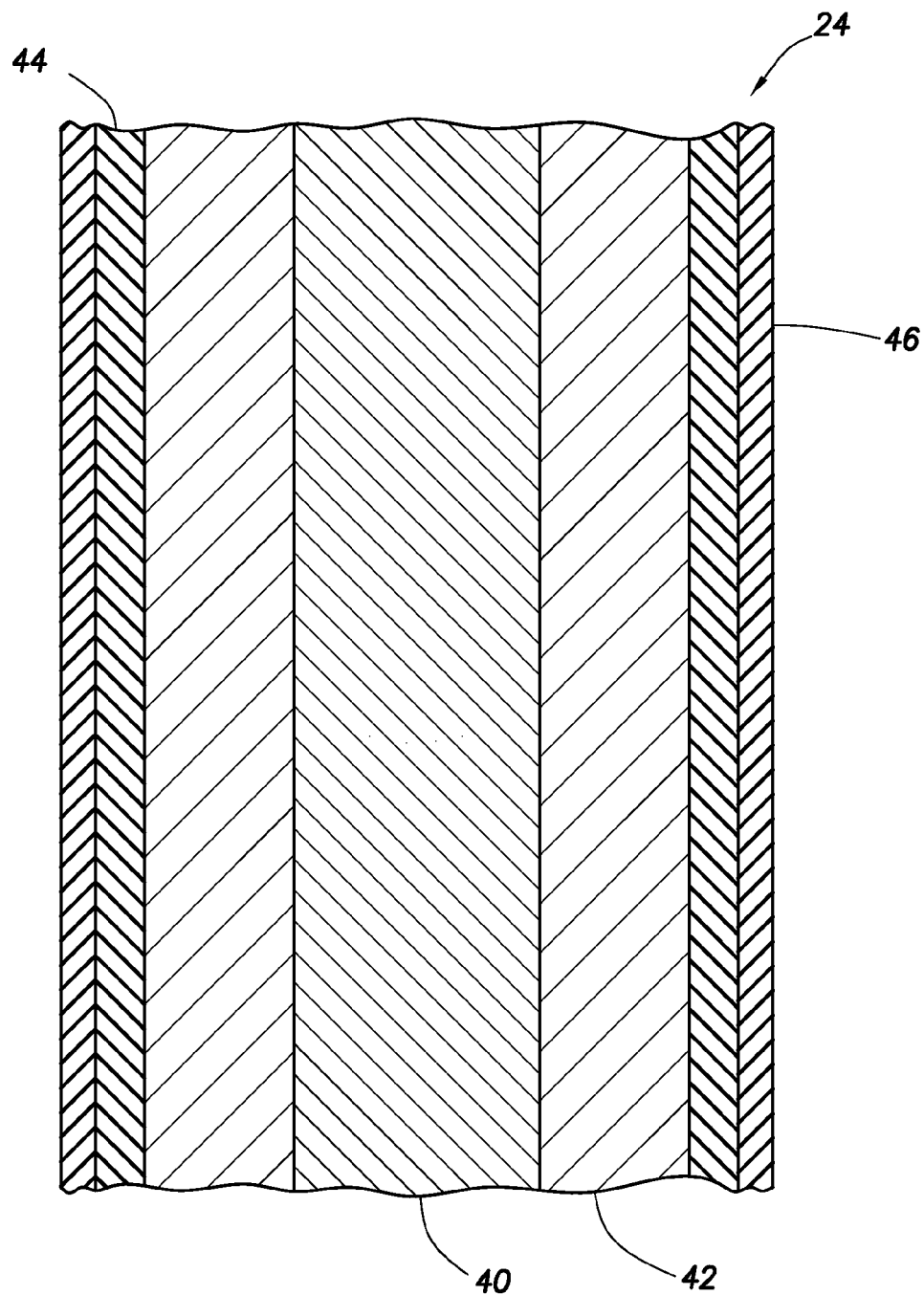
FIG. 2 is a representative cross-sectional view of a multiple core optical fiber which may be used in the system and method of FIG. 1.

Referring additionally now to FIG. 2, an enlarged scale cross-sectional view of a longitudinal section of the optical fiber 24 is representatively illustrated. In this view, it may be seen that the optical fiber 24 includes an inner core 40 surrounded by an outer core (or inner cladding) 42. The outer core 42 is surrounded by an outer cladding 44 and a protective polymer jacket 46.

Although only two cores 40, 42 are depicted in FIG. 2, any number or combination of cores may be used in other examples. Although the cores 40, 42 and other elements of the optical fiber 24 are depicted as being substantially cylindrical or annular in shape, other shapes may be used, as desired. Thus, the scope of this disclosure is not limited to the details of the optical fiber 24 as depicted in the drawings or described herein.

The inner and outer cores 40, 42 may be single mode or multiple mode. Thus, the optical fiber 24 can include one or more single mode core(s), one or more multiple mode core(s), and/or any combination of single and multiple mode cores.

By using multiple cores 40, 42 in the optical fiber 24, fewer optical fibers are needed to sense a given number of well parameters. This reduces the number of penetrations through pressure bulkheads in the well, and simplifies installation of downhole sensing systems.

Figure 3:
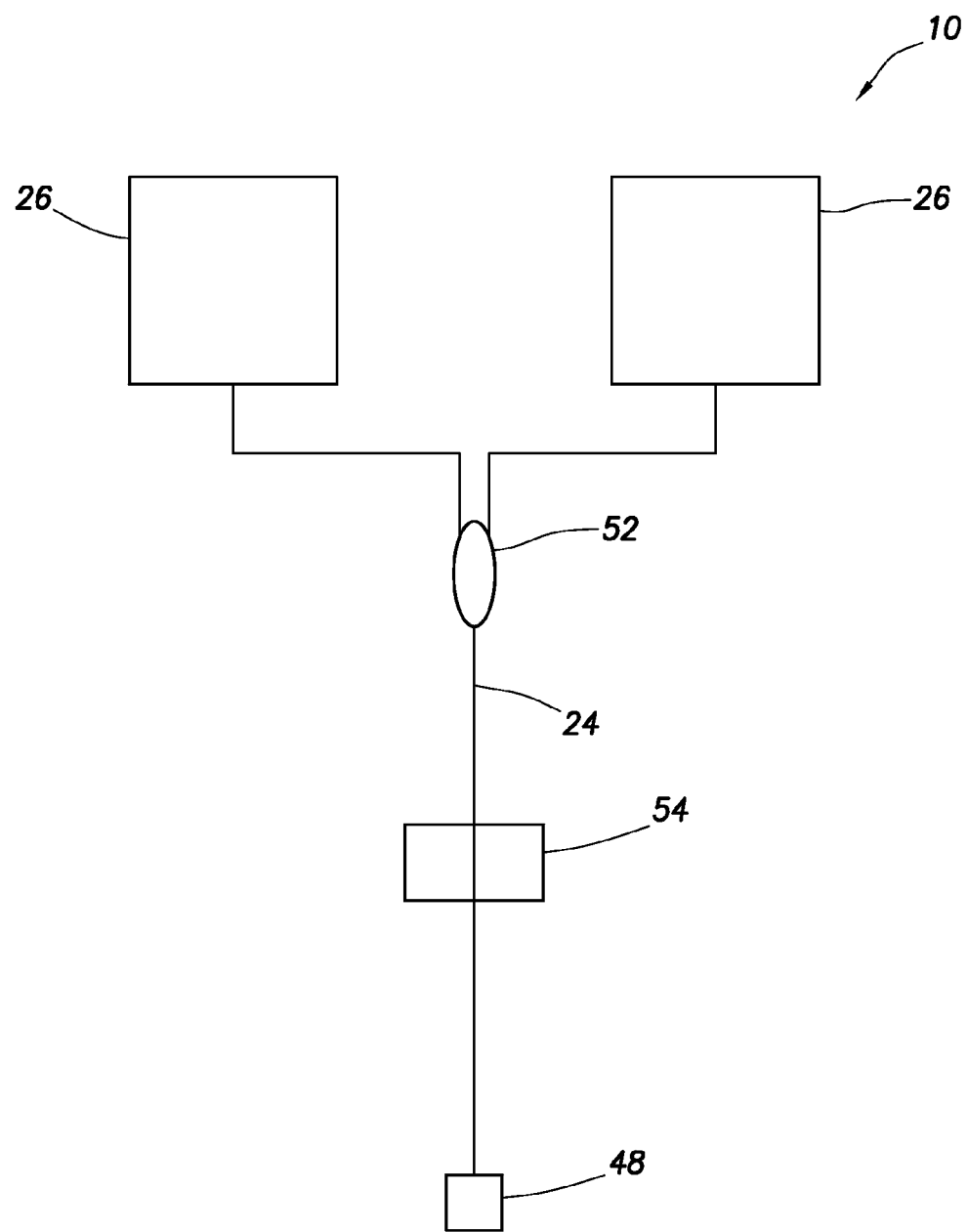
FIG. 3 is a representative schematic view of another example of the downhole sensing system.

Referring additionally now to FIG. 3, an example of the multiple core optical fiber 24 being used in the system 10 is schematically and representatively illustrated. In this example, the cores 40, 42 are used for sensing strain and temperature as distributed along the optical fiber 24. The cores 40, 42 are not visible in FIG. 3, but are part of the optical fiber 24.

An interrogator 26 is coupled to the inner core 40, and another interrogator is coupled to the outer core 42. An optical coupler 52 is used to couple the interrogators 26 to the respective cores 40, 42. A single interrogator 26 capable of interrogating each of the cores 40, 42 may be used in some examples.

Note that the optical fiber 24 extends through at least one penetration 54 in the well. The penetration 54 may be in a pressure bulkhead, such as at a wellhead, packer, etc. By incorporating multiple cores 40, 42 into the single optical fiber 24, fewer penetrations 54 are needed, thereby reducing time and expense in installation and maintenance of the system 10.

In one example, both of the cores 40, 42 are single mode, and Brillouin scattering in both of the cores is detected, in order to sense temperature and strain as distributed along the optical fiber 24. However, one or more multiple mode cores may be used, in keeping with the scope of this disclosure.

Although only a single inner core 40 is depicted in FIG. 2, multiple inner cores may be used, if desired. If multiple inner cores are used, then the interrogator(s) 26 may be coupled to two or more of the inner cores instead of, or in addition to, being coupled to the outer core 42.

The cores 40, 42 in this example have different Brillouin scattering coefficients, enabling a unique high resolution determination of both temperature and strain along the fiber 24. Since the cores 40, 42 have different Brillouin scattering coefficients, different Brillouin frequency shifts will be detected for the cores in response to a given change in strain and/or temperature.

In general, Brillouin frequency shift is given by the following equation:

$$v_{Bs} = \Delta\epsilon B_\epsilon + \Delta T B_T \tag{1}$$

where $v_{Bs}$ is a Brillouin frequency shift, $\Delta\epsilon$ is a change in strain, $\Delta T$ is a change in temperature, $B_\epsilon$ is a Brillouin strain coefficient, and $B_T$ is a Brillouin temperature coefficient.

For a given multiple core optical fiber 24, the Brillouin strain and temperature coefficients are known for each core 40, 42, or can readily be experimentally verified. The Brillouin frequency shift due to a change in strain and/or temperature can be determined for each core 40, 42 using the interrogator 26 and control system 34.

One advantage of using the multiple core optical fiber 24 is that each of the cores 40, 42 is subjected to the very same conditions in the well. Thus, since the change in strain and change in temperature will be the same for the cores 40, 42, by measuring the Brillouin frequency shift for each of the cores, Equation 1 can be solved for each of the cores (two linear equations with two unknowns), thereby yielding the strain and temperature changes.

Thus, strain and temperature can readily be determined as distributed along the optical fiber 24. This result is achieved, at least in part, by providing the optical fiber 24 with multiple cores 40, 42, the cores having different Brillouin scattering coefficients.

The interrogators 26 can be optically coupled to the cores 40, 42, for example, at the earth's surface, a subsea location, another remote location, etc. One or more downhole sensor(s) 48 may be optically coupled to the core 40 or 42 in the well.

The downhole sensor 48 can comprise any type of sensor capable of being optically coupled to the fiber 24 for optical transmission of well parameter indications via the fiber. For example, optical sensors based on fiber Bragg gratings, intrinsic or extrinsic interferometers (such as Michelson, Fabry-Perot, Mach-Zehnder, Sagnac, etc.) may be used to sense strain, pressure, temperature, vibration and/or other well parameters. Such optical sensors are well known to those skilled in the art, and so will not be described further here.

It may now be fully appreciated that the above disclosure provides significant advancements to the art of optical sensing in wells. In examples described above, multiple cores 40, 42 of the optical fiber 24 may have different Brillouin scattering coefficients, thereby enabling discrimination between strain and temperature contributions to Brillouin frequency shifts in the cores. In one example, only a single optical fiber 24 is used to determine both strain and temperature as distributed along the fiber in the well.

A downhole optical sensing system 10 is provided to the art by the above disclosure. In one example, the system 10 can include an optical fiber 24 positioned in a well, the optical fiber including multiple cores 40, 42. At least a first one of the cores 40 having a Brillouin scattering coefficient which is different from at least a second one of the cores 42.

Both of the first and second cores 40, 42 can comprise single mode cores. The multiple cores 40, 42 can comprise a combination of single mode and multiple mode cores. The first core 40 may be surrounded by the second core 42.

The system 10 can include at least one optical interrogator 26 optically coupled to the optical fiber 24. The optical interrogator 26 detects Brillouin scattering in each of the first and second cores 40, 42.

Scattering of light in the first and second cores 40, 42 can be measured as an indication of strain and temperature along the optical fiber 24.

At least one of the multiple cores 40, 42 may be optically coupled to a sensor 48 in the well.

The Brillouin scattering coefficient may be a Brillouin strain coefficient $B_\epsilon$ and/or a Brillouin temperature coefficient $B_T$.

A method of sensing strain and temperature as distributed along an optical fiber 24 is also described above. In one example, the method can comprise: measuring Brillouin scattering in a first core 40 of the optical fiber 24 disposed in a well, and measuring Brillouin scattering in a second core 42 of the optical fiber 24 disposed in the well, the first and second cores 40, 42 being exposed to a same strain and temperature distribution in the well. The first core 40 may have a different Brillouin scattering coefficient as compared to the second core 42.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A downhole optical sensing system, comprising:
    an optical fiber positioned in a subterranean well, the optical fiber including multiple cores, each core having a Brillouin strain coefficient and a Brillouin temperature coefficient, which coefficients are properties of the core;
    at least a first one of the cores having a Brillouin scattering coefficient that is different from at least a second one of the cores, wherein the Brillouin scattering coefficient is one of a Brillouin strain coefficient different from that of the at least a second one of the cores or a Brillouin temperature coefficient different from that of the at least a second one of the cores; and
    an optical sensor disposed in the subterranean well and coupled to one or more of the first one of the cores or the second one of the cores at an end of the optical fiber in the subterranean well distal from earth's surface, the optical sensor operable to sense one or more parameters of the subterranean well, the optical sensor being an optical sensor different from an optical fiber structure.

2. The downhole optical sensing system of claim 1, wherein both of the first and second cores are single mode cores.

3. The downhole optical sensing system of claim 1, further comprising at least one optical interrogator optically coupled to the optical fiber, wherein the optical interrogator detects Brillouin scattering in each of the first and second cores.

4. The downhole optical sensing system of claim 1, wherein scattering of light in the first and second cores is measured as an indication of strain and temperature along the optical fiber.

5. The downhole optical sensing system of claim 1, wherein the multiple cores comprise a combination of single mode and multiple mode cores.

6. The downhole optical sensing system of claim 1, wherein the Brillouin scattering coefficient is a Brillouin strain coefficient.

7. The downhole optical sensing system of claim 1, wherein the Brillouin scattering coefficient is a Brillouin temperature coefficient.

8. The downhole optical sensing system of claim 1, wherein the first core is surrounded by the second core.

9. The downhole optical sensing system of claim 1, wherein the multiple cores are exposed to a same strain and temperature distribution in the well.

10. A method of sensing strain and temperature as distributed along an optical fiber, the method comprising:
    measuring Brillouin scattering in a first core of the optical fiber disposed in a well using a first interrogator, the first core having a first Brillouin strain coefficient and a first Brillouin temperature coefficient, which coefficients are properties of the first core;
    measuring Brillouin scattering in a second core of the optical fiber disposed in the well using the first interrogator or using a second interrogator, the second core having a second Brillouin strain coefficient and a second Brillouin temperature coefficient, which coefficients are properties of the second core, the first core having a different Brillouin strain coefficient as compared to the second core or a different Brillouin temperature coefficient as compared to the second core, the first and second cores being exposed to a same strain and temperature distribution in the well; and
    sensing one or more parameters of the well using an optical sensor disposed in the well and coupled to one or more of the first core or the second core at an end of the optical fiber in the well distal from earth's surface, the optical sensor being an optical sensor different from an optical fiber structure.

11. The method of claim 10, wherein using a first interrogator includes interrogating using a tunable laser.

12. The method of claim 11, wherein the Brillouin scattering coefficient is a Brillouin strain coefficient.

13. The method of claim 11, wherein the Brillouin scattering coefficient is a Brillouin temperature coefficient.

14. The method of claim 10, wherein the first core is surrounded by the second core.

15. The method of claim 10, wherein the first and second cores comprise single mode cores.

16. A method of sensing strain and temperature as distributed along an optical fiber, the method comprising:
    measuring Brillouin scattering in a first core of the optical fiber disposed in a well, the first core having a first Brillouin strain coefficient and a first Brillouin temperature coefficient, which coefficients are properties of the first core;
    measuring Brillouin scattering in a second core of the optical fiber disposed in the well, the second core having a second Brillouin strain coefficient and a second Brillouin temperature coefficient, which coefficients are properties of the second core, the first core having a different Brillouin strain coefficient as compared to the second core or a different Brillouin temperature coefficient as compared to the second core; and
    sensing one or more parameters of the well using an optical sensor disposed in the well and coupled to one or more of the first core or the second core at an end of the optical fiber in the well distal from earth's surface, the optical sensor being an optical sensor different from an optical fiber structure.

17. The method of claim 16, wherein the first and second cores are exposed to a same strain and temperature distribution in the well.

18. The method of claim 16, wherein the Brillouin scattering coefficient is a Brillouin strain coefficient.

19. The method of claim 16, wherein the Brillouin scattering coefficient is a Brillouin temperature coefficient.

20. The method of claim 16, wherein the first core is surrounded by the second core.

21. The method of claim 16, wherein the first and second cores comprise single mode cores.

* * * * *